US006366651B1

(12) United States Patent
Griffith et al.

(10) Patent No.: US 6,366,651 B1
(45) Date of Patent: Apr. 2, 2002

(54) COMMUNICATION DEVICE HAVING CAPABILITY TO CONVERT BETWEEN VOICE AND TEXT MESSAGE

(75) Inventors: Gary L. Griffith, Arvada, CO (US); Wilfred E. Lehder, Monmouth, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/010,422

(22) Filed: Jan. 21, 1998

(51) Int. Cl.$^7$ .......................... H04M 1/64; H04M 11/00; G10L 13/06
(52) U.S. Cl. ................ 379/88.14; 379/67.1; 379/88.13; 379/88.18; 379/100.13; 704/258; 704/260
(58) Field of Search .................... 379/67.1, 88.13, 379/88.14, 88.22, 93.24, 100.08, 100.13, 100.15, 93.23, 88.18; 455/412–415, 566, 556; 709/203, 206, 207; 704/235, 258, 260

(56) References Cited

U.S. PATENT DOCUMENTS

| | | | | |
|---|---|---|---|---|
| 4,481,382 A | * | 11/1984 | Villa-Real ................... | 455/556 |
| 5,321,737 A | * | 6/1994 | Patsiokas ..................... | 455/414 |
| 5,327,486 A | * | 7/1994 | Wolff et al. ............... | 379/93.23 |
| 5,557,659 A | * | 9/1996 | Hyde-Thomson ............ | 379/88 |
| 5,568,540 A | * | 10/1996 | Greco et al. .................. | 379/89 |
| 5,572,643 A | * | 11/1996 | Judson ........................ | 395/793 |
| 5,608,786 A | * | 3/1997 | Gordon ....................... | 379/100 |
| 5,652,789 A | * | 7/1997 | Miner et al. ................. | 379/201 |
| 5,724,410 A | * | 3/1998 | Parvulescu et al. ....... | 379/88.18 |
| 5,742,905 A | * | 4/1998 | Pepe et al. ................... | 455/461 |
| 5,884,262 A | * | 3/1999 | Wise et al. .................. | 704/270 |
| 5,911,129 A | * | 6/1999 | Towell ........................ | 704/272 |
| 5,940,598 A | * | 8/1999 | Strauss et al. ......... | 395/200.79 |
| 5,943,055 A | * | 8/1999 | Sylvan ........................ | 345/349 |
| 5,953,392 A | * | 9/1999 | Rhie et al. ................ | 379/88.13 |
| 6,005,927 A | * | 12/1999 | Rahrer et al. ............... | 379/142 |
| 6,014,429 A | * | 1/2000 | LaPorta et al. .......... | 379/88.15 |
| 6,018,710 A | * | 1/2000 | Wynblatt et al. ........... | 704/260 |
| 6,021,181 A | * | 2/2000 | Miner et al. ............. | 379/88.23 |
| 6,061,718 A | * | 5/2000 | Nelson ....................... | 709/206 |

* cited by examiner

Primary Examiner—Allan Hoosain
(74) Attorney, Agent, or Firm—Patton Boggs, LLP

(57) ABSTRACT

The communication device provides the capability to automatically convert between voice and text messages. This communication device enables the calling party to input a message in voice mode, then activate the communication device to automatically convert the message into a text message format for transmission to the called party. The communication device can display the content of the text message prior to transmission or can retrieve the message from its memory and play the message back to the calling party in an audio mode. The communication device automatically initiates the outgoing call and, since the message is transmitted in a text mode to the called party, the destination can be a computer system or output to a printer. This feature therefore enables hands free operation for E-Mail. The communication device also provides a data retrieval feature where the user can retrieve E-Mail or voice mail messages using the communication device and have the retrieved messages output in either text or audio format. The retrieved messages, since they are stored in memory in the communication device, can be forwarded to another destination once the user has reviewed their content.

18 Claims, 3 Drawing Sheets

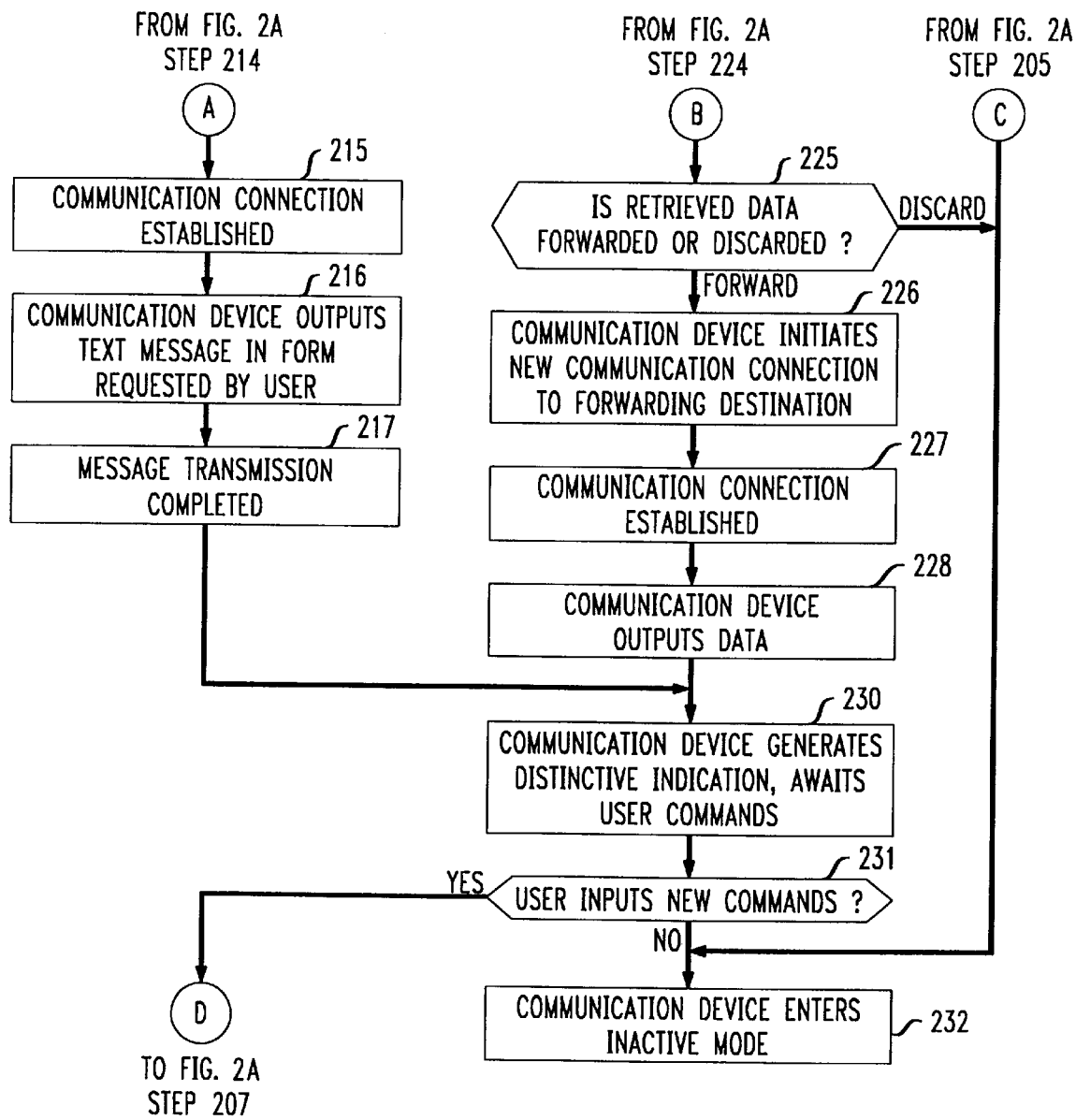

COMMUNICATION DEVICE HAVING CAPABILITY TO CONVERT BETWEEN VOICE AND TEXT MESSAGE

FIELD OF THE INVENTION

This invention relates to communication devices and, in particular, to apparatus contained in the communication device that automatically converts between text and voice mode communications, and can for example generate and transmit a text message based upon the user input voice commands and voice message.

PROBLEM

It is a problem in communications technology to efficiently transfer information among users. It is also a significant problem to bridge the disjunct architectures of the various communication systems presently in use for voice and text communications.

Voice communication systems rely on a direct connection on a real time basis from the calling party to the called party or their agent. If the called party is unavailable, the incoming call can be completed to an agent that can comprise either a human operator: message center operator, receptionist, secretary or an automated system for message storage: answering machine, voice mail system and the like. All of these systems operate on a real time direct connection basis, wherein the calling party provides a voice communication that is immediately delivered as it is being generated to the called party or delivered to and recorded by the called party's agent for later retrieval by the called party. A problem with these systems is that the transmission and storage of voice represents a high bandwidth communications mode, especially the storage of a voice message, which in many cases relies on the use of a mechanical system, such as a tape drive, that is more prone to maintenance problems than an electronic system. However, the cost of storing real time voice messages in an electronic memory based system represents a significant expense.

The alternative text based communication systems operate by the calling party generating a text message and transmitting same to the called party over a communication medium. The text message mode represents a non-real time message system, wherein the calling party generates the text message in real time, on a personal computer for example, but the message is not transmitted as it is generated. It is only when the calling party is satisfied with the content of the text message and activates the transmission of the message that the message is forwarded to the called party in its entirety. Examples of such transmissions are E-Mail over the Internet or an intranet, and facsimile transmissions. The transmitted text message is delivered to the called party by storage of the text message in a memory appropriate for the type of message transmitted. The storage and ultimate retrieval by the called party is also non-real time in nature. For example, the facsimile transmission must be received by the called party's facsimile machine, decoded and then printed out by a printer. In many cases the called party is equipped with a fax/modem device on a personal computer that stores the received fax in a computer memory for later retrieval and printing by the called party. Furthermore, the E-Mail transmission is passed from mailbox to mailbox via the Internet servers, again not in real time, but more likely in a batch mode mail transfer from transfer point to transfer point in the Internet until the message is stored in the called party's mailbox. The mail is retrieved by the user only when the user queries the mailbox to determine whether a message is stored therein.

There is even a crossover system of converting the received voice message to a text message and this comprises the use of message center operators or secretaries, who transcribe the received message into a text format. However, this system is expensive to operate and subject to traffic limitations.

Therefore, the problems with existing message communication systems are that they are limited to use of a single format of communication: either voice or text and they are either real time person to person or non-real time "mailbox" types of communications. Thus, the calling and called parties must operate in the same message mode to be able to communicate. These limitations of existing message communications systems also result in additional expense when the information conveyed must be converted from the native format of the original message to an alternative form. This typically requires the recreation of the message in the alternate format by the called party with the inherent expense of such an operation. There are no existing systems that enable the calling party or even the called party to selectively generate and receive messages in any desired format, regardless of the message mode of the other party to the communications session.

SOLUTION

The above described problems are solved and a technical advance achieved in the field by the present communication device that provides the capability to automatically convert between voice and text messages. The communication device 100 supports both one-way and two-way communications. In the one-way communication environment, a user can implement one-way text messaging: text transmission from the user to a called party, text transmission from a user to a computer system, text transmission from the user to a text storage medium, text transmission from a computer system to the user. In the two-way communication environment, a user can implement two-way text messaging: voice-to-text conversion at each party's telephone station which text is transmitted to the other party (computer system or human recipient) where it is converted into voice, voice-to-text conversion at each user's telephone station which text is transmitted to the other party (computer system or human recipient).

As an example, this communication device enables the calling party to input a message in voice mode, then activate the communication device to automatically convert the message into a text message format for transmission to the called party. The communication device can display the content of the text message prior to transmission or can retrieve the message from its memory and play the message back to the calling party in an audio mode. The communication device automatically initiates the outgoing call and, since the message is transmitted in a text mode to the called party, the destination can be a computer system or output to a printer. This feature therefore enables hands free operation for E-Mail. The communication device also provides a data retrieval feature where the user can retrieve E-Mail or voice mail messages using the communication device and have the retrieved messages output in either text or audio format. The retrieved messages, since they are stored in memory in the communication device, can be forwarded to another destination once the user has reviewed their content.

Thus, the present communication device bridges the gap between existing voice communication systems and text based communication systems. The communication device enables users to communicate by exchanging messages even though their communication formats differ. In addition, the communication device can be used as a secure data input device since it can be equipped to authenticate the identity of the user via voiceprint identification.

BRIEF DESCRIPTION OF THE DRAWING

FIGS. 2A–2B illustrate in flow diagram form the operation of the present communication device having the capability to convert between voice and text messages in a typical call scenario.

DETAILED DESCRIPTION

System Architecture

Figure 1:
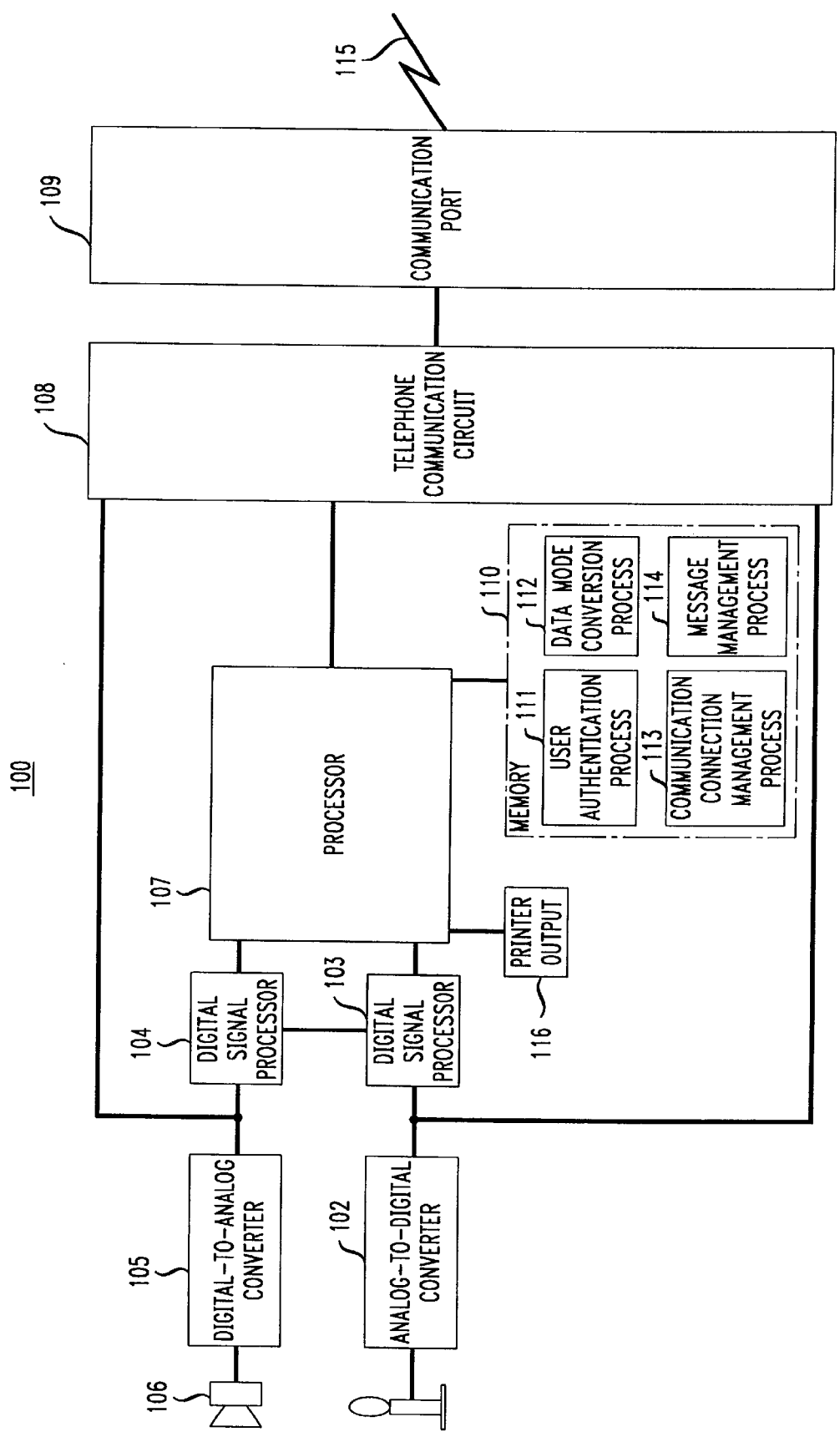
FIG. 1 illustrates in block diagram form the architecture of the present communication device having the capability to convert between voice and text messages.

FIG. 1 illustrates in block diagram form the architecture of the present communication device having the capability to convert between voice and text messages 100. This communication device 100 comprises either a wireless telephone station set or a non-wireless telephone station. In either case, the technology used to implement the basic elements of the communication device 100 are well known and are not described in detail herein. The additional elements comprise the memory 110, processor 107 with its set of control instructions 111–114, the voice-to-text 102, 103 and text-to-voice 104, 105 converter circuits which function to enhance the communication capabilities of the basic station set. For the purpose of illustration, the present description is couched in terms of a wireless communication device, although he wired alternative is equally applicable.

The communication device 100 comprises a microphone 101 that receives audio input from the user and converts the received audio signals to analog electrical signals. The output of the microphone 101 is applied to an analog to digital converter circuit 102 that produces digital signal indicative of the audio input. These digital signals are processed by a digital signal processor 103 that functions to convert the digital signals to text data. In the reverse communication path, a digital signal processor 104 is responsive to received text input for generating digital signals indicative of the received text message. The digital signals are converted by digital to analog converter 105 into analog signals that produce audio output when applied to speaker 106. The standard telephone communication circuitry 108 is included to enable to the communication device 100 to operate in a conventional manner to transmit the user input audio signals to the communication port 109 in electrical signal form and in the return path transmit received electrical signals from the communication port 109 to the user in audio signal form at the loudspeaker 106. The communication port 109 in this example is the wireless transceiver apparatus that establishes the wireless communication connection between the communication device and a wireless server comprising a transceiver system (not shown), as is well known in wireless communications.

The communication device 100 also comprises a processor 107 that is equipped with a memory 110 and sets of program instructions 111–114 that function when executed in processor 107 to implement the communication services described herein. Included in the sets of program instructions 111–114 are a user authentication process 111, data mode conversion process 112, communication connection management process 113, message management process 114, and the like. The operation of this apparatus is described below in conjunction with the description of the flowcharts of FIGS. 2A–2B. The various elements noted herein can be implemented in various alternate configurations, such as the combination of the analog-to-digital converter and the digital-to-analog converter elements into a single device. The selection of the particular functional architecture of FIG. 1 is for the purpose of illustrating the functionality embodied in the communication device.

Communication Modes

There are a plurality of communication modes that are possible using the communication device 100. In particular, the voice-to-text and text-to-voice conversion capability of the communication device 100 supports both one-way and two-way communications. In the one-way communication environment, a user can implement one-way text messaging: text transmission from the user to a called party, text transmission from a user to a computer system, text transmission from the user to a text storage medium, text transmission from a computer system to the user. In the two-way communication environment, a user can implement two-way text messaging: voice-to-text conversion at each party's telephone station which text is transmitted to the other party (computer system or human recipient) where it is converted into voice, voice-to-text conversion at each user's telephone station which text is transmitted to the other party (computer system or human recipient).

Call Origination

Figure 2A:
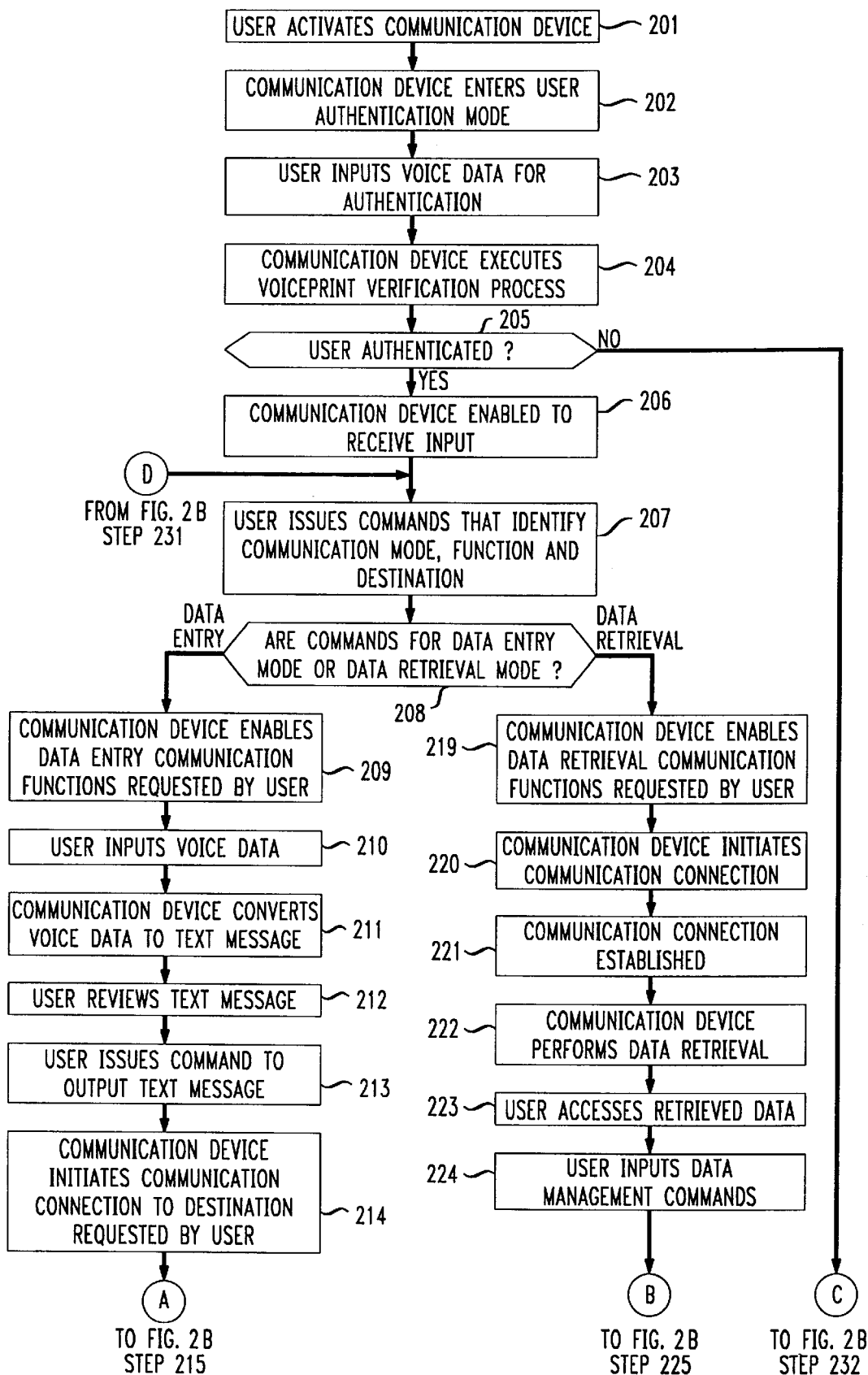

An example of the operation of the present communication device is provided in FIGS. 2A–2B wherein the examples of a call origination by a user with the conversion of the user's voice input to a text message which is automatically transmitted to a destination and the retrieval of messages by the user are both used.

The present communication device 100 is operational as a data entry tool and personal communication device for the user and can be activated at step 201 by means of an on/off switch (not shown) on the communication device 100 or even voice activated wherein the communication device 100 remains in a monitor mode until activated by the speaking of a predetermined command by the user, such as "initiate call." The communication device 100, when activated, recognizes user input voice commands and also preferably the voice of the user. This is accomplished by applying the output of microphone 101 to an analog to digital converter circuit 102 that produces digital signal indicative of the audio input. These digital signals are processed by a digital signal processor 103 that functions to convert the digital signals to text data. The communication device 100 can optionally include a user authentication function 111 wherein at step 202 the communication device 100 enters a user authentication mode. The user at step 203 inputs voice data, such as a predetermined phrase or series of words, to serve as user authentication input. The communication device 100 at step 204 executes the user voiceprint verification process which may be operational in digital signal processor 103 and processor 107 determines at step 205 whether the user is a valid user of the communication device 100. Since the communication device 100 may be used by a number of users, the capability can be provided to enable the communication device 100 to respond to a plurality of users. For simplicity of description, the case of a single user is provided herein. If at step 205 the user is not authenticated, processing advances to step 232 where the communication device 100 enters the inactive mode and the communication initiation attempt by the unauthorized user is thereby rejected. If the user is authenticated at step 205, processing advances to step 206 where the communication device 100 is enabled to receive user message data input. At step 207, the user inputs commands to initiate a selected communication function that is programmed into memory 110. Since the present communication device 100 is capable of performing many communication functions in various communication modes, the following description illustrates both a typical data entry operation and a typical data retrieval operation to thereby illustrate some of the functionality provided by the present communication device 100.

Data Entry Mode

At step 208, the communication device 100 receives the commands that have been issued by the user and makes a determination of the proper mode of operation that has been requested. The two modes illustrated are data entry and data retrieval. Assume that the user has issued a command for data entry at step 207, processing then advances to step 208. A typical data entry mode is for a user to input a voice message that is to be transmitted in text form to a designated destination. In this case, the user must input not only the voice message but also an indication of the destination for this message and the format of the message. The order of data entry in not critical and the following sequence of events can be modified as desired in implementing the communication device 100. For example, the user can issue the command "send call" which activates the message management process 114 of communication device 100, wherein the voice input message is to be transmitted to a defined destination. The user identifies the destination by issuing, for example, the command "to my personal computer" immediately after "send call." This sequence of commands identifies the function and message destination. An additional data entry can be used in this sequence to define the format of the communication. Thus, the user can note "text message" as part of the initial command input stream to enable the data mode conversion process 112 of communication device 100 to convert the format of the user's message into the user designated format of the output message. In response to the above-noted command strings issued by the user, at step 209 the communication device 100 enables the data communication functions that have been requested by the user. The address of the destination is stored by processor 107 in memory 110 for later retrieval and in this example, the digital signal processor circuit 103 is activated to receive the users voice input, convert it into a text message and store the text message in memory 110 for later transmission (possibly with a prior review by the user).

The user then inputs the voice message into the communication device 100 at step 210. In the present example, the user inputs a message that is destined for the user's personal computer, such as a reminder of the need to make travel plans for an out-of-state meeting on a predetermined date. The communication device 100 at step 211 converts the voice input into a text message and stores the text in memory 110, using the apparatus described above. Upon the conclusion of the data entry, the user can optionally activate the message management process 114 of communication device 100 at step 212 to display the text message on display 116 to ensure the accuracy of the message. The communication device scrolls the text message on the display 116 and thereby enable the user to confirm the content of the text message prior to transmission. If the message is to be discarded and rerecorded, the user can input verbal commands to activate these functions at this juncture. For the purpose of this example, it is assumed that the user confirms the message content and at step 213 the user wishes to transmit the text message to the indicated destination. This is accomplished by the user issuing an appropriate voice command, such as "send message" which activates the communication connection management process 113 of communication device 100 at step 214 to initiate a call connection to the identified destination. In the present example, the communication connection management process 113 initiates a wireless call origination by activating the communication port 109, receives dial tone and outpulses the communication device number of the identified destination, the user's personal computer. Once the call connection is established to the identified destination at step 215, the communication connection management process 113 retrieves text message from memory 110 and outputs this message over the communication connection to the designated destination for storage therein at step 216.

Once the text message transmission is completed at step 217, processing advances to step 218 where the communication connection management process 113 generates a distinctive indication to advise the user that the requested communication function has been executed successfully. At step 219 the communication device 100 determines whether the user has issued a new command. If no new commands are issued within a predetermined period of time, processing advances to step 232 where the communication device 100 enters the inactive or standby mode. Alternatively, if the user issues another command at step 219, processing returns to step 207 and these commands are processed as described above.

Data Retrieval Mode

The above data entry example illustrates how the user can use the communication device 100 to generate and transmit a text message by providing voice input. At step 208, the user could have alternatively entered the data retrieval mode. For example, the user can request that the communication device 100 access the user's personal computer or an Internet provider to retrieve E-Mail messages that are stored therein. The user could also request the communication device 100 to access the user's voice mail system to retrieve the voice messages that are stored therein. For the sake of illustration, the latter example is used herein.

The commands issued by the user at step 207 indicate activation of a data retrieval function that is programmed into the communication device 100. The communication device 100 at step 219 enables the data communication functions that have been requested by the user. The address of the destination is stored in memory 110 as part of the preprogrammed function definition. Thus, at step 220 the message management process 112 interprets the request to access the user's voice mail by activating the communication connection management process 113 to retrieve the telephone number of the user's voice mail system from memory 110 and initiating a communication connection to this destination. At step 221 the communication connection is established to the user's voice mail system, as described above, and at step 222 the communication device 100 performs the data retrieval function, such as entering the user's access code into the voice mail system and activating the message retrieval function. The user can activate the message management function 114 to receive the retrieved voice messages at step 223 either in audio or text form as selected by the user. For example, the user can elect to hear the audio playback of the message which, as it is being received from the voice mail system, is also being converted into a text message by the communication device 100 and stored in memory 110. The user can then save the text message version of the voice mail for later forwarding to another destination or later playback in either text or audio format. The user can issue commands at step 224 to activate the various data management functions provided by the communication device 100. At step 225 the communication device 100 interprets the received commands to determine whether the retrieved data is to be discarded or forwarded. If the user command signifies discard, the message management process 112 discards the retrieved data and processing advances to step 220 where the distinctive indication is provided to the user and the communication device 100 awaits further commands as described above.

If at step 225 the communication device 100 determines that the user has signified that the retrieved message is to be forwarded to a designated destination, such as the user's personal computer or a printer jack on the communication device 100, then at step 226, the communication device 100 initiates a communication connection to the designated destination as described above. In the present example, the communication device 100 retrieves the telephone number of the user's personal computer from memory 110 and dials this number to access the user's personal computer. At step 227 the communication connection is established and the communication device 100 performs the necessary access steps required to enable entry into the user's personal computer, such as providing a password. At step 228 the communication device 100 outputs the data in the form of the text message version of the retrieved voice mail message for storage in an appropriate location on the user's personal computer. Once this function is completed, the communication connection is dropped and processing advances to step 220 where the distinctive indication is provided to the user and the communication device 100 awaits further commands as described above.

Transmission Mode

The transmission of data between a calling party and a called party can be effected in a variety of ways. In particular, the transmission of the text data requires significantly less bandwidth than the real-time transmission of voice data. Therefore, the text data can be transmitted over the standard call connection as with voice transmissions, or alternative modes of transmission can be used. In particular, if the data is transmitted via non-call associated signaling, the D Channel ISDN messaging can be used or alternatively an Internet connection. If the data is transmitted via call associated signaling, DTMF tones or an equivalent mechanism can be used. In addition, the receipt of a text call connection can be signified at the called telephone station set by the use of distinctive ringing or other distinguishing indication.

Additional Capabilities

It is evident that the present communication device 100 has extensive adaptability and can save many communication needs. The above examples are simply one set of scenarios where the benefits of such a communication device is self-evident. To further illustrate the extensive capabilities of the communication device 100, the call context is selected to be that of a user performing a secure data entry into a computer system using the communication device 100 as the data input terminal. An example of such an application is a hospital environment, where there are a number of competing factors that make the operation of the hospital and the data collection for patient care a daunting task. In particular, the patient records are confidential and can be viewed only by authorized personnel. In addition, the traditional manual charting of patient care records is time consuming and fraught with errors due to the lack of clarity of the handwriting of some of the health care professionals and the necessity to input the data in many cases in a non-real time mode. It is not atypical for notes to be made regarding patient care and these notes later transcribed on to the patient's chart. Furthermore, the patient's chart, when in use is unavailable to all other health care providers. Many hospitals are transitioning from the paper based patient charts to an electronic data entry system wherein the patient records are directly input into a central database. One problem with this form of data entry is that the data must be keyboarded into the system, and many health care professionals are not adept typists. Furthermore, the data may still be transcribed from informal notes into the database system in a non-real time mode, thereby compromising the integrity of the data entry. Using the present communication device 100, the identity of the user can be authenticated for security purposes and the voice input can be the patient data, such as: vital signs, fluid intake and output, medications administered, nurse's notes, and the like. The verbal input of the data can be verified by the message scrolling feature of the communication device and the transmission of the data to the central patient database be effected as noted above for the example of the user transmitting a text message to their personal computer.

Summary

Thus, the present communication device bridges the gap between existing voice communication systems and text based communication systems. The communication device enables users to communicate by exchanging messages even though their communication formats differ. In addition, the communication device can be used as a secure data input device since it can be equipped to authenticate the identity of the user via voiceprint identification.

What is claimed:

1. A communication device, located in a communication system, for exchange of voice and text message communications with an identified destination, said communication device comprising:

means, responsive to receipt from a user of voice signals, comprising a message and associated command strings, for converting said message into text message format;

means for identifying said command strings contained in said voice signals, for activation of said communication device, comprising:

means for comparing said input voice signals with a predetermined set of command strings indicative of predefined communication functions;

means, responsive to said comparison indicating a match of said voice signals with a one of said predetermined set of command strings, for excerpting said command strings from said voice signals, means for retrieving from a memory, contained in said communication device, a set of program instructions that, when executed, cause said communication device to perform a one of said predefined communication functions;

means for originating a telephone call from said communication device to a user identified destination, pursuant to said one of said predetermined set of command strings; and means for transmitting a text message, comprising said message contained in said voice signals, to said user identified destination pursuant to said one of said predetermined set of command strings.

2. The communication device of claim 1 further comprising:

means for enabling said user to review said text message prior to activation of said means for transmitting to transmit said text message.

3. The communication device of claim 1 further comprising:

means, responsive to user input voice commands, for activating a communication connection to a user designated destination to retrieve at least one text message from said designated destination.

4. The communication device of claim 3 further comprising:
means for forwarding said retrieved text message to a user designated destination.

5. The communication device of claim 1 further comprising:
means, responsive to user input voice commands, for activating a communication connection to a user designated destination to retrieve at least one voice message from said designated destination.

6. The communication device of claim 5 further comprising:
means for converting said retrieved voice message into a text message indicative of said retrieved voice message.

7. The communication device of claim 6 further comprising:
means for forwarding said generated text message indicative of said retrieved voice message to a user designated destination.

8. The communication device of claim 1 further comprising:
means, responsive to user input voice signals, for authenticating an identity of said user.

9. The communication device of claim 1 wherein said means for transmitting comprises:
means for initiating a communication connection with said designated destination; and
means for generating signals required by said designated destination to effect exchange of said text message with said designated destination.

10. A method of operating a communication device, located in a communication system, for exchange of voice and text message communications with an identified destination, comprising executing in said communication device the steps of:
converting, in response to receipt from a user of voice signals, comprising a message and associated commands, said message into text message format;
identifying said command strings contained in said voice signals for activation of said communication device, comprising:
comparing said input voice signals with a predetermined set of command strings indicative of predefined communication functions;
excerpting, in response to said comparison indicating a match of said voice signals with a one of said predetermined set of command strings said command strings from said voice signals,
retrieving, from a memory located in said communication device, a set of program instructions that, when executed, cause said communication device to perform a one of said predefined communication functions;
originating a telephone call from said communication device to a user identified destination, pursuant to said one of said predetermined set of command strings; and
transmitting a text message, comprising said message contained in said voice signals, to said user identified destination pursuant to said one of said predetermined set of command strings.

11. The method of operating a communication device of claim 10 further comprising the step of:
enabling said user to review said text message prior to activation of said means for transmitting to transmit said text message.

12. The method of operating a communication device of claim 10 further comprising the step of:
activating, in response to user input voice commands, a communication connection to a user designated destination to retrieve at least one text message from said designated destination.

13. The method of operating a communication device of claim 12 further comprising the step of:
forwarding said retrieved text message to a user designated destination.

14. The method of operating a communication device of claim 10 further comprising the step of:
activating, in response to user input voice commands, a communication connection to a user designated destination to retrieve at least one voice message from said designated destination.

15. The method of operating a communication device of claim 14 further comprising the step of:
converting said retrieved voice message into a text message indicative of said retrieved voice message.

16. The method of operating a communication device of claim 15 further comprising:
means for forwarding said generated text message indicative of said retrieved voice message to a user designated destination.

17. The method of operating a communication device of claim 10 further comprising the step of:
authenticating, in response to user input voice signals, an identity of said user.

18. The method of operating a communication device of claim 10 wherein said step of transmitting comprises:
initiating a communication connection with said designated destination; and
generating signals required by said designated destination to effect exchange of said text message with said designated destination.

* * * * *